United States Patent [19]

Hirayama et al.

[11] Patent Number: 4,566,069

[45] Date of Patent: Jan. 21, 1986

[54] ELECTRONIC CONTROL APPARATUS FOR AN INTERNAL COMBUSTION ENGINE

[75] Inventors: Takeshi Hirayama, Mito; Matsuo Amano; Shinichi Sakamoto, both of Hitachi; Masami Shiida, Mito; Shirou Baba, Tokorozawa, all of Japan

[73] Assignee: Hitachi, Ltd., Tokyo, Japan

[21] Appl. No.: 652,892

[22] Filed: Sep. 21, 1984

Related U.S. Application Data

[63] Continuation of Ser. No. 313,831, Oct. 22, 1981, abandoned.

[30] Foreign Application Priority Data

Oct. 22, 1980 [JP] Japan ................................ 55-146935

[51] Int. Cl.[4] ........................ G05B 15/02; G01P 3/48; F02B 5/02

[52] U.S. Cl. ................................ 364/431.12; 324/166; 364/565; 377/51

[58] Field of Search .............. 364/431.07, 565, 431.12; 377/9, 19, 26, 31, 37, 41, 44, 51, 109, 118; 324/166, 173

[56] References Cited

U.S. PATENT DOCUMENTS 4,055,993 11/1977 Rackliffe et al. .................. 324/173
4,056,778 11/1977 Randazzo ........................... 324/166
4,086,470 4/1978 Asbee .................................. 377/26
4,128,892 12/1978 Vasa ................................... 377/26 X
4,274,142 6/1981 Furuhashi et al. .................. 364/565
4,281,388 7/1981 Friend et al. ...................... 324/166 X

FOREIGN PATENT DOCUMENTS 2559261 7/1977 Fed. Rep. of Germany ........ 377/44
47-22310 6/1972 Japan ..................................... 377/44
379919 4/1973 U.S.S.R. ................................ 377/44

*Primary Examiner*—Felix D. Gruber
*Attorney, Agent, or Firm*—Antonelli, Terry & Wands

[57] ABSTRACT

An engine control apparatus includes a microprocessor, a ROM for holding a program required for the operation of the microprocessor, and a RAM for holding data supplied from the microprocessor. Pulse signals representative of results of the arithmetic operations executed by the arithmetic unit on the basis of input signals available from various sensors as well as data stored in the memory in accordance with the program are supplied to actuators for controlling engine operations through an input/output circuit. The control apparatus further includes a counter for counting crank angle pulses produced in synchronism with rotation of the engine shaft, an interrupt request generating circuit for requiring an interrupt to the microprocessor when overflow occurs in the counter. In response to every interrupt request, the microprocessor causes the count value held in the RAM to be incremented by unity. After elapse of a period for measuring the rotational speed of the engine, the count value held in the counter of the input/output circuit is corrected by the number of overflows held in the RAM.

7 Claims, 9 Drawing Figures

ELECTRONIC CONTROL APPARATUS FOR AN INTERNAL COMBUSTION ENGINE

This is a continuation of application Ser. No. 313,831 filed Oct. 22, 1981, and now abandoned.

The present invention relates in general to an electronic contrl apparatus for an internal combustion engine (hereinafter referred to also as an engine). More particularly, the invention concerns an electronic control apparatus which is adapted for electronically controlling operations of the engine in a comprehensive and coordinative manner, and which is capable of measuring the speed of rotation of the engine with a high accuracy with the aid of a counter of a small bit capacity.

For accomplishing a comprehensive and coordinative control of engine operation in a satisfactory manner through digital processing of various engine parameters derived from the numerous control units associated with the engine by using a microcomputer, it is necessary for acquiring the load state of the engine to detect with a high accuracy the speed of rotation or revolution of the engine over a whole range from a low rotation speed region to a high region, because the speed of rotation of the engine is a primary parameter for the comprehensive engine control, and because detection accuracy thereof exerts influences directly on the precision or accuracy with which the engine operation is controlled.

Improvement of the accuracy with which the revolution speed of the engine is measured may be accomplished by elongating the period which pulses produced in synchronism with rotation of the engine are counted by a counter. However, the duration of such measuring period varies considerably in dependence on the rotation speed of the engine. Accordingly, in order to attain equivalently a sufficiently long measuring period with a view to improving the detection accuracy of the engine rotation speed, it is necessary to use a counter of a large bit capacity, which in turn means that the bit capacity of associated registers and the like has to be correspondingly increased, involving eventually an increased quantity of required hardware.

An object of the present invention is to provide an electronic control apparatus for an internal combustion engine which allows the speed of rotation of the engine to be measured or acquired with a high accuracy using a counter of a low bit capacity over the whole engine rotation range from low to high engine speed regions.

In view of the object mentioned above, it is proposed according to an aspect of the invention that an interrupt signal is produced upon occurrence of overflow in a counter adapted for counting pulses produced in synchronism with the rotation or revolution of the engine in the course of measuring the rotation speed of the engine upon elapse of the measuring period, wherein the count value fetched from the counter in response to the interrupt signal is corrected by an overflow generating circuit in accordance with software, to thereby determine the true speed of rotation of the engine.

The present invention will be apparent from the following detailed description taken in conjunction with the accompanying drawings, in which.

Figure 5:
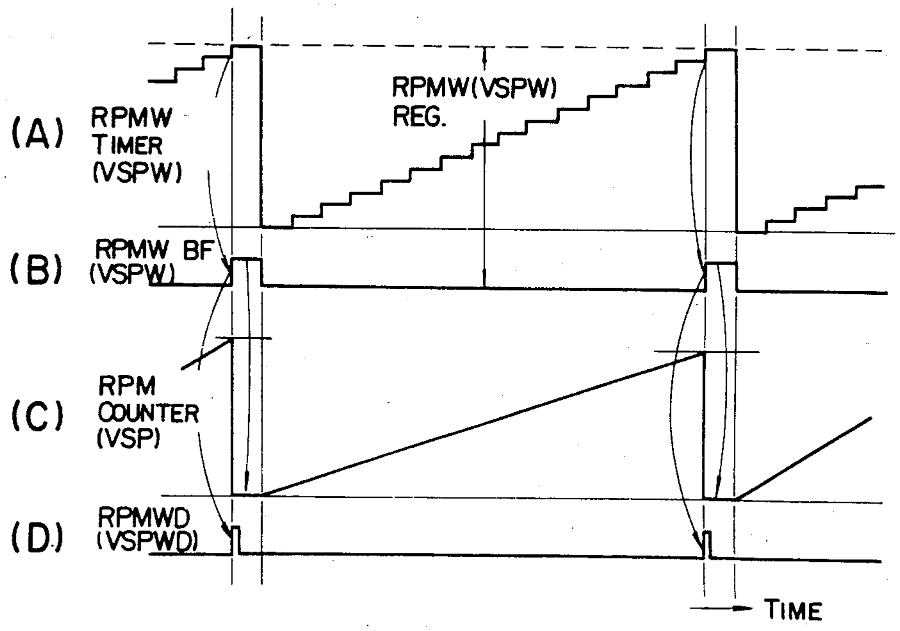
Figure 6:
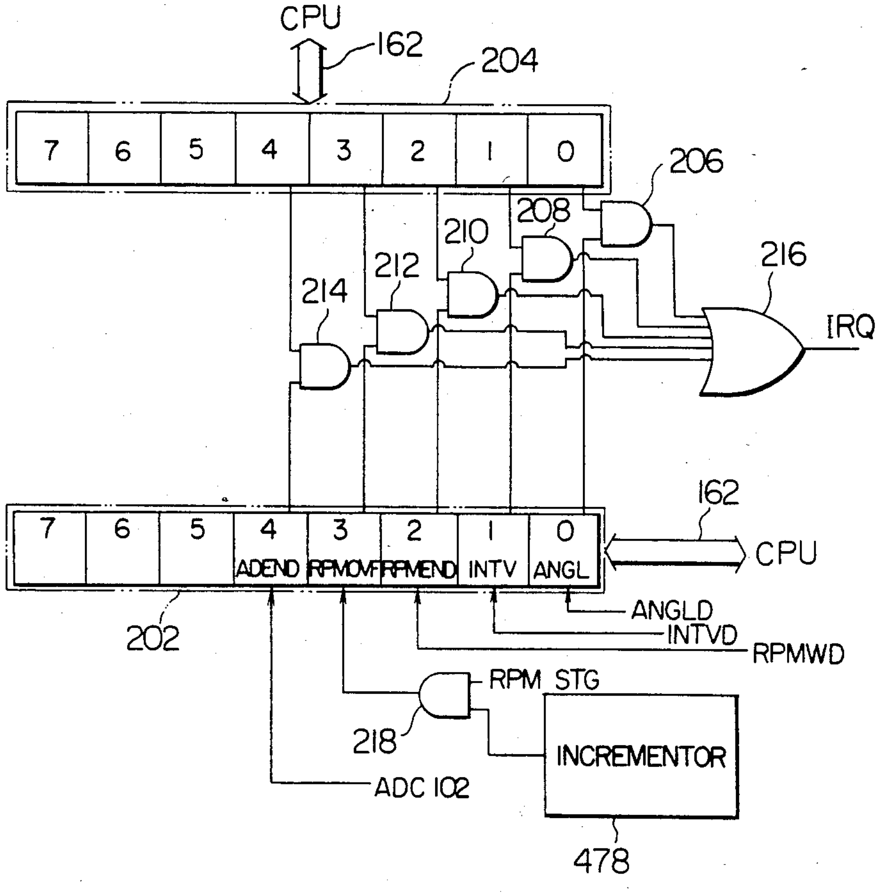
Figure 7:
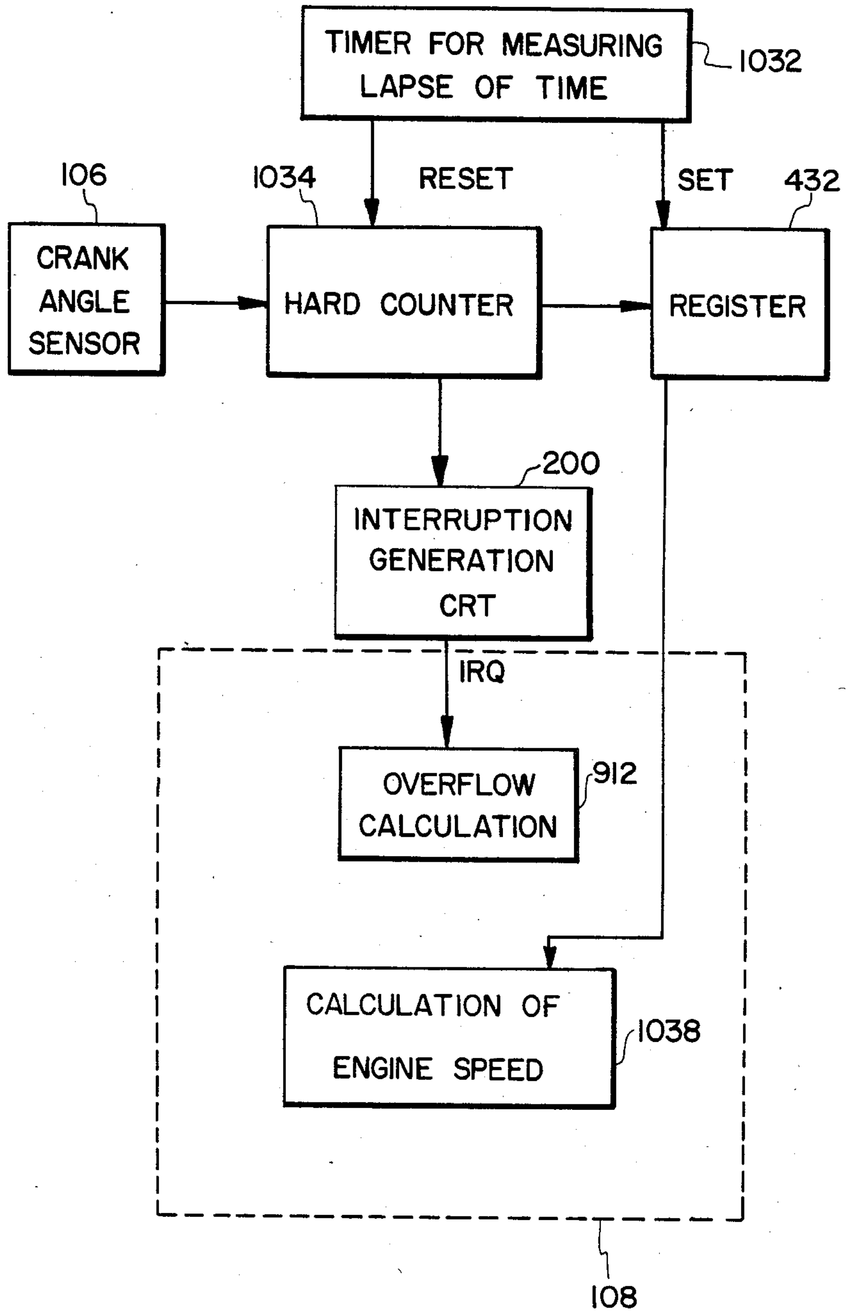
Figure 8:
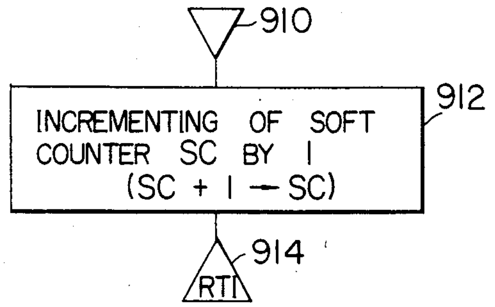
Figure 9:
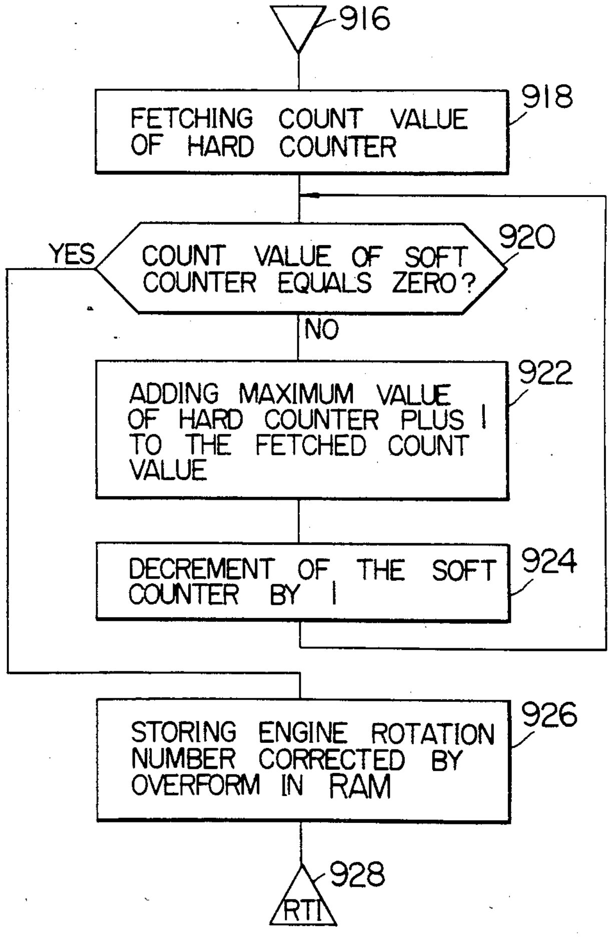

FIG. 5 graphically illustrates operation for detecting engine rotation speed or vehicle speed;

FIG. 6 is a circuit diagram to illustrate an exemplary circuit configuration of an interrupt signal generating circuit;

FIG. 7 is a schematic block diagram of one embodiment of the engine measuring apparatus of the present invention;

FIG. 8 is a flow chart to illustrate processings realized in accordance with a RPMOVF interrupt processing program; and FIG. 9 is a flow chart illustrating processings executed in accordance with a RPMEND interrupt processing program.

In the following, the present invention will be described in detail in conjunction with exemplary embodiments of the invention shown in the accompanying drawings.

Figure 1:
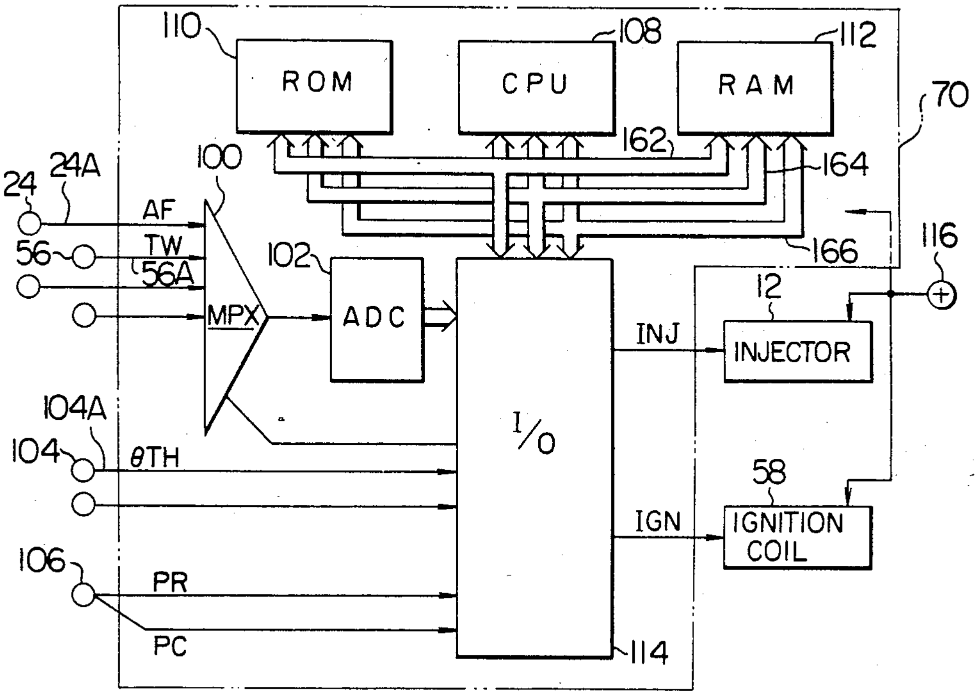
FIG. 1 shows in a block diagram an exemplary circuit configuration of the control system.

The operations of the control circuit 70 for controlling various engine operations, such as ignition and fuel injection, will be described by referring to FIG. 1, which shows in a block diagram an exemplary circuit arrangement of the control circuit 70. The input signals to the control circuit 70 may generally be classified into three categories. Namely, the analog signals such as the output signal 24A of the heater element 24 for detecting the suction air quantity and the output signal 56A from the sensor 56 destined for detecting the temperature of engine coolant belong to the first signal category or group. These analog input signals are supplied to a multiplexer 100 (hereinafter referred to simply as MPX) to be selectively sampled on a time division basis and supplied to an analog-to-digital converter 102 (hereinafter referred to simply as ADC), to be thereby converted into a corresponding digital signal. A signal belonging to the second category is constituted by a signal 104A produced by a switch 104 which is operated in an interlocked relation with the throttle valve in response to a signal θTH representative of the fully closed state of the throttle valve. This signal serving as an ON/OFF signal can be treated as a digital signal of a single bit.

Input signals belonging to the third category are in a form of pulse trains and may include the reference angle signal (hereinafter referred to simply as PR) and the constant angle signal (hereinafter referred to simply as PC) which are supplied from the crank angle sensor 106. The reference angle or PR signal is produced every 180°, 120° and 90° in the engines of four cylinders, six cylinders and eight cylinders, respectively.

A reference numeral 108 denotes a central processing unit (hereinafter referred to simply as CPU) which serves for executing digital processing operations, while 110 denotes a memory element (hereinafter referred to simply as ROM, an abridgement of read-only memory) for storing therein control programs and fixed data. A reference numeral 112 denotes a random access memory (hereinafter referred to simply as RAM) which permits read-out and write-in operations. This memory incorporates therein a soft counter for counting the number of overflows occurring in the operation of a hard counter which is employed in measuring engine speed, as will be described in more detail hereinafter. An input/output interface circuit 114 (hereinafter referred to simply as an input/output or I/O circuit) receives as inputs thereto the signals from the ADC 102 as will as the sensors 104 and 106 and transfers these signals to the CPU 108. Further, the I/O circuit serves to transfer signals INJ and IGN from the CPU 108 to the injector 12 and the ignition coil 58. Although not shown in detail in FIG. 1, it will be understood that required voltages are supplied to the individual circuits and elements constituting the control circuit 70 from a power supply source 116. The injector 12 is provided with an electromagnetic coil for actuating the injection valve, while the ignition coil incorporates a primary winding for storing therein electromagnetic energy. One end of the coil and the winding are connected to the power source terminal 116 with the other ends thereof being connected to the I/O circuit 114 for controlling the currents fed to the injector 12 and the ignition coil. In FIG. 1, reference numerals 162, 164 and 166 denote a data bus, an address bus and a control bus, respectively.

Figure 2:
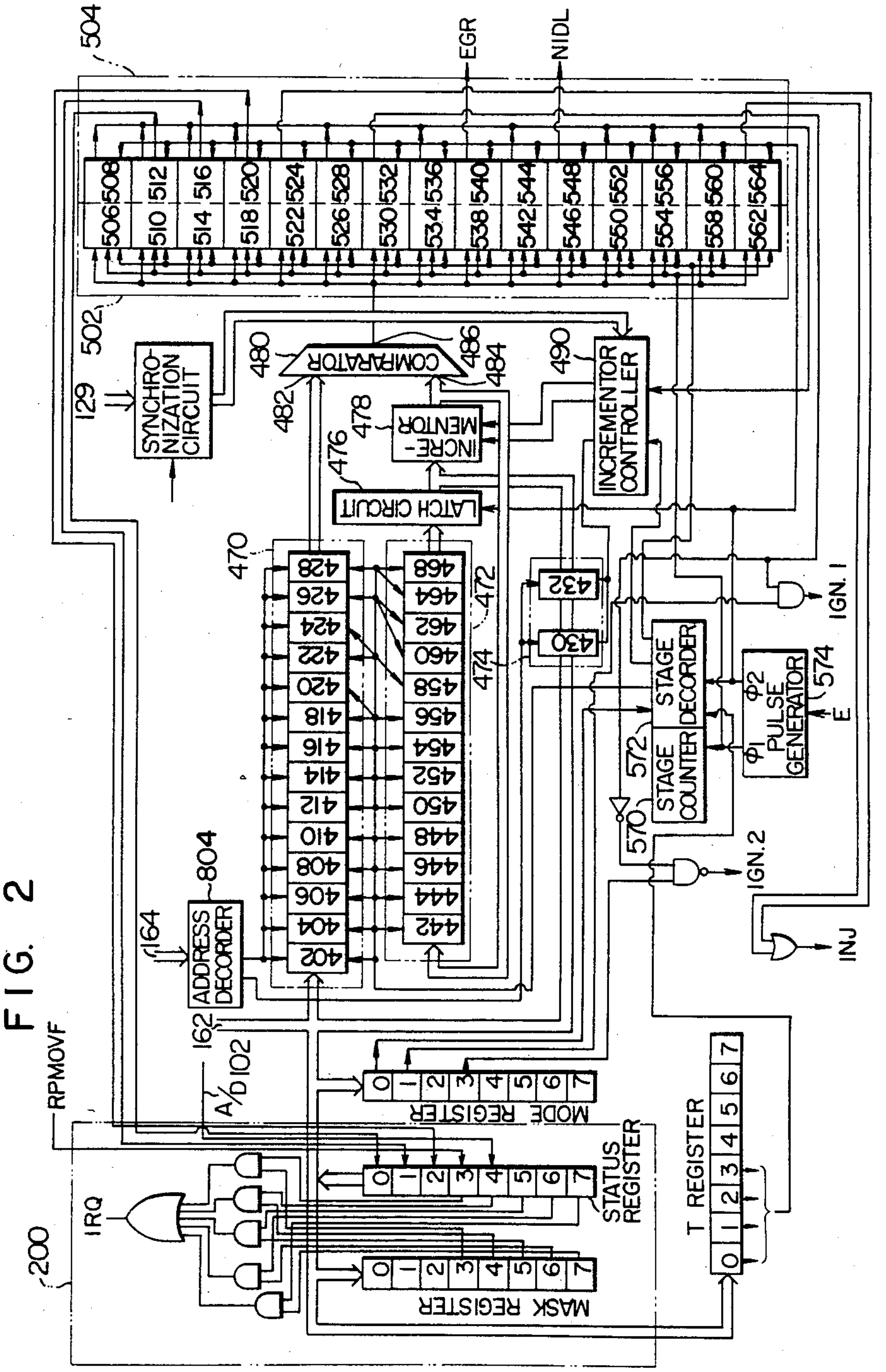
FIG. 2 shows in detail a circuit arrangement of an input/output interface circuit shown in FIG. 1.

FIG. 2 shows in detail a concrete example of the I/O circuit 114. Referring to the figure, a register group 470 comprises references registers which serve to hold the data processed by the CPU 108 and data representing the predetermined fixed values, as described hereinbefore. These pieces of data are transferred from the CPU 108 to the reference register group 470 through the data bus 162. Each of the registers is specified through the address bus 164 to receive and hold the associated data. The register group 470 is composed of registers 402 to 428.

A register group 472 comprises instantaneous registers which serve to hold the instantaneous states of the engine and the associated mechanisms. The instantaneous register group 472, a latch circuit 476 and an incrementor 478 implement a so-called counter function.

An output register group 474 comprises, for example, a register 430 for holding the rotational speed of the engine and a register 432 for holding the vehicle speed. These values are transferred from the instantaneous registers when certain conditions are satisfied. Each register of the output register group 474 is selected by the signal sent from the CPU 108 through the address bus and the content of the selected register is sent to the CPU 108 through the data bus 162.

A comparator 480 receives, for comparison, at its input terminals 482 and 484 the reference data from selected registers of the reference register group and the instantaneous data from selected registers of the instantaneous register group, respectively. The result of the comparison by the comparator 480 is delivered at its output terminal 486. The output delivered at the output terminal 486 is set in the selected registers of a first comparison output register group 502 serving as a comparison result holding circuit, and then set in the corresponding registers of a second comparison output register group 504.

The operations of accessing (i.e. reading out of a writing in) the reference register group 470, the instantaneous register group 472 and the output register group 474, the operations of the incrementor 478 and the comparator 480, and the operations of setting the output of the comparator 480 in the first and second comparison output register groups 502 and 504 are all performed within a predetermined period of time. Other various processings are performed on a time division basis in accordance with the order of the stages instructed by a stage counter 572. In each stage, one of the registers constituting the reference register group 470, one of the registers of the instantaneous register group 472, one of the registers of the first comparison result register group 502, one of the registers of the second comparison result register group 504 and, if necessary, one of the registers of the output register group 474 are selected. The incrementor 478 and the comparator 480 are used in common. A reference numeral 200 denotes an interrupt signal generating circuit which is constituted by a status register 202, a mask register 204 and a group of gate circuits and is adapted to produce various interrupt signals in response to predetermined conditions, which signals are sent to the CPU 108.

Figure 3:
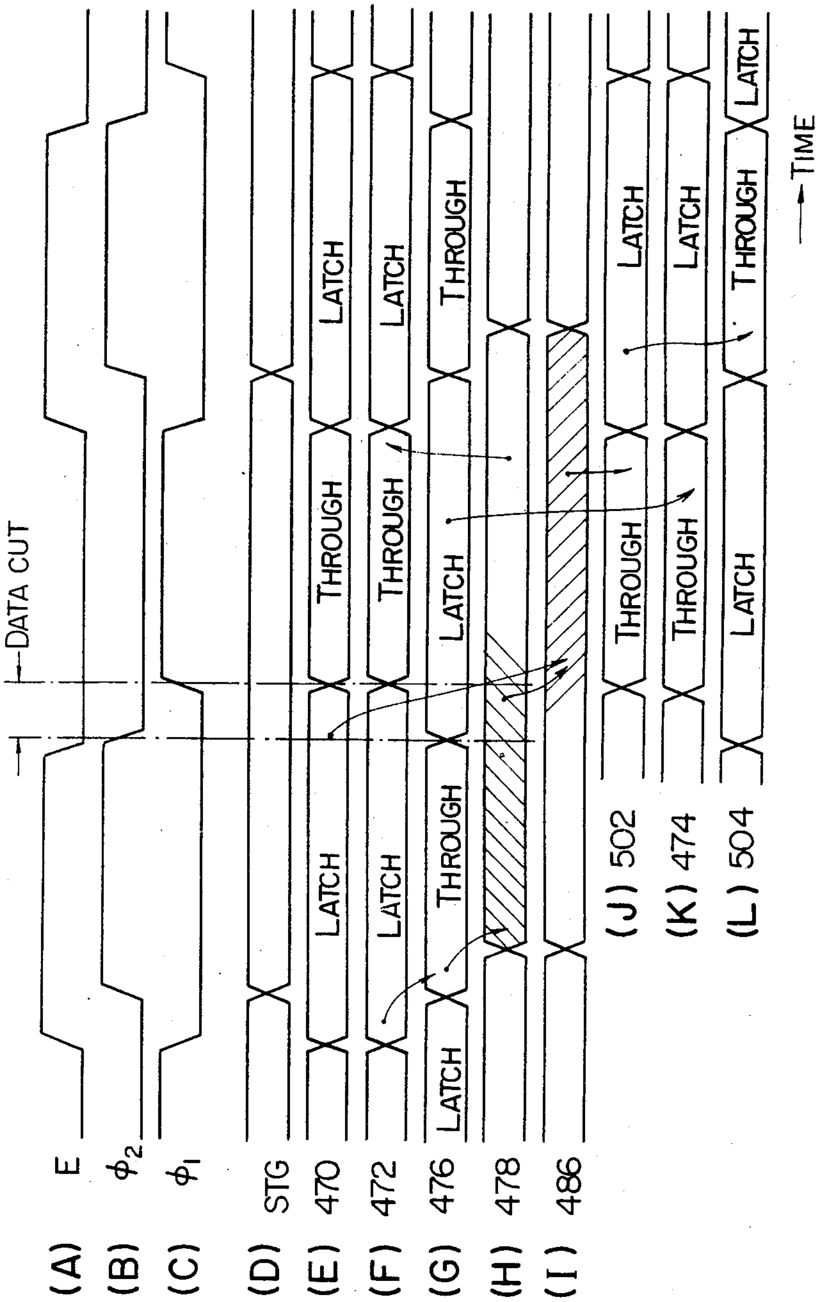
FIG. 3 is a timing diagram for illustrating operations of the input/output interface circuit shown in FIG. 2.

FIG. 3 shows diagrams useful in explaining the operation of the circuit in FIG. 2. The clock signal E, shown in the diagram A, is supplied from the CPU 108 to the input/output or I/O circuit 14. Two clock signals $\phi 1$ and $\phi 2$ shown at B and C, respectively, and having no overlap with each other are derived from the clock signal E by means of a pulse generating circuit 574. The circuit shown in FIG. 2 is operated on the basis of these clock signals $\phi 1$ and $\phi 2$.

The diagram D in FIG. 3 depicts a stage signal the level of which is switched over upon the rising transition of the clock signal $\phi 2$. The processing in each stage is performed in synchronism with the clock signal $\phi 2$. In FIG. 3, "THROUGH" indicates that the latch circuit and the register circuits are in the enabled conditions and that the outputs of these circuits depend on the inputs thereto. Also, "LATCH" means that these circuits hold certain data and that the outputs therefrom are independent of the inputs thereto.

The stage signal shown at D in FIG. 3 serves to read data out of the reference register group 470 and the instantaneous register group 472, that is, to read out the contents of certain selected registers of the groups. Diagrams E and F represent the operations of the reference and instantaneous register groups 470 and 472, respectively. These operations are performed in synchronism with the clock signal $\phi 1$.

The diagram G indicates the operation of the latch circuit 476. The latch circuit 476 takes the THROUGH state, when the clock signal $\phi 2$ is at high level, serving to fetch the content of a particular register selected from among the instantaneous register group 472. When the clock signal $\phi 2$ is at low level, on the other hand, the latch circuit 476 takes the LATCH state. Thus, the latch circuit 476 serves to hold the content of the specific register of the instantaneous register group selected in accordance with the stage assumed then. The data held in the latch circuit 476 is altered on the basis of external conditions by means of the incrementor 478 which is operated independently from the clock signals.

The incrementor 478 performs the following functions in response to the signal from the incrementor controller 490. The first function is the function of incrementing, to increase by unity the value of the input data. The second is the function of non-incrementing, to pass the input data without any change. The third is the function of resetting, to change the entire input into data representing the value 0 (zero).

As seen from the flow of data through the instantaneous register group 472, one register of the group 472 is selected by the stage counter 572 and the data held by the selected register is supplied to the comparator 480 through the latch circuit 476 and the incrementor 478. Further, there is provided a closed loop extending from the output of the incrementor 478 back to the selected register. Therefore, when the incrementor performs the function of increasing the data by unity, the closed loop functions as a counter. Consequently, if the data delivered from the particular register selected from among the instantaneous register groups is again received by the particular register at the input through the return or feedback loop mentioned above, an erroneous operation will take place. For this reason, the latch circuit 476 is provided to prevent such unwanted circulation of data. Namely, the latch circuit 476 takes the THROUGH state in timing with the clock signal $\phi$2, while the THROUGH state in which input data is to be written in the instantaneous registers 472 is in synchronism with the clock signal $\phi$1. Therefore, data is blocked or cut at the interval between the clock signals $\phi$1 and $\phi$2. Namely, even if the content of any specific register of the group 472 is changed, the output of the latch circuit 476 remains unchanged.

The comparator 480, just like the incrementor 478, operates out of timing with the clock signals. The comparator 480 receives as its inputs the data held in a register selected from the reference register group 470 and the data held in a register selected from the instantaneous register group 472 and sent through the latch circuit 476 and the incrementor 478. The result of the comparison of both data is set in the first comparison result register group 502 which takes the THROUGH state in timing with the clock signal $\phi$1. The set data is further loaded in the second comparison result register group 504 which takes the THROUGH state in synchronism with the clock signal $\phi$2. The outputs of the register group 504 are the signals for controlling the various functions of the incrementor described above and the signals for driving the fuel injectors, the ignition coil and the exhaust gas recycle apparatus.

Also, in response to these signals, the results of the measurements of the rotational speed of the engine and the vehicle speed are transferred from the instantaneous register group 472 to the output register group 474 at every stage. For example, in the case of writing the rotational speed of the engine, a signal indicating that a preset time has elapsed is held in the register RPMWBF 552 of the second comparison result register group 504 and the data held in the register 462 of the instantaneous register group 472 is transferred to the register 430 of the output register group 474 in response to the output of the register 552 at a RPM stage.

Unless the signal indicating the elapse of the preset time is set in the register RPMWBF 552, the operation to transfer the data held in the register 462 to the register 430 never takes place at the RPM stage.

On the other hand, the data held in the instantaneous data register 468 and representing the vehicle speed VSP is transferred to the output register 432 in response to the signal from the second comparison result register VSPWBF 556 in time with the VSP stage signal.

The loading of the data representing the rotational speed RPM of the engine and the vehicle speed VSP in the output register group 474 is performed as follows. Reference should be had again to FIG. 5. When the stage signal STG is in RPM or VSP-writing mode, the data from the instantaneous data register 462 or 468 is written in the latch circuit 476 if the clock signal $\phi$2 is then at high level, since the latch circuit 476 takes the THROUGH stage when the clock signal $\phi$2 is at high level. At the low level of the clock signal $\phi$2, the written data is latched. The thus latched or held data is then written in the output register group 474 in time with the high level of the clock signal $\phi$1 in response to the signal from the register RPMWBF 552 or VSPWBF 556 since the output register group 474 takes the THROUGH state when the clock signal $\phi$1 is at high level, as indicated at K in FIG. 5. The written data is latched at the low level of the clock signal $\phi$1.

In the case of reading-out the data held in the output register group 474 by the CPU 108, the CPU 108 first selects one of the registers 430 and 432 of the group 474 through the address bus 164 and then takes in the contents of the selected register in time with the clock signal E shown at A in FIG. 5.

Figure 4:
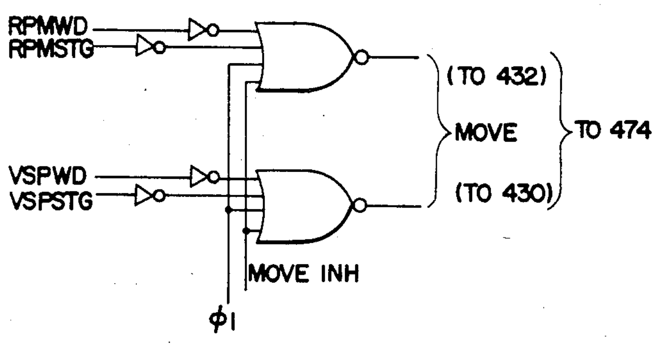
FIG. 4 is a circuit diagram showing in detail a part of the incrementor controller.

FIG. 4 shows in detail a part of the incrementor controller 490, for generating a signal MOVE for transferring data to the output register groups 430 and 432. The incrementor has three functions: the first function is to increment the value of the input data by unity, the second is to reset the input data, and the third is to pass the input data without change. The incrementing function, i.e. the first function is performed in response to the count signal COUNT and the reset function is carried out in response to the reset signal RESET. When the count signal is at the high level, the incrementing function is performed while the non-incrementing function is performed when the count signal is at the low level. When the reset signal RESET is at the high level, the reset function is carried out. The reset signal RESET is given a preference over the count signal.

The various conditions are selected in response to the stage signals specified by the respective processings. The conditions refer to the synchronized external inputs and outputs from the second comparison result register group 504. The condition for transferring data to the output register group 474 are the same as that for the control of the incrementor.

FIG. 5 illustrates a manner of measuring and processing the rotation number of engine RPM (or vehicle speed VSP). The measurement is performed by determining a certain measurement duration by the RPMW timer 460 and also by counting the synchronized angle pulses PC within the determined duration.

The content of the RPMW timer 460 for measuring the measurement duration is incremented unconditionally and reset when the content of the RPMWBF register 552 is "1". If, as the result of comparison, the content of the RPMW timer 460 is greater than or equal to the content of the RPMV register 426, "1" is set in the RPMWFF register 550.

In response to the signal RPMWD representing the rising edge of the output signal of the RPMWBF 552, the content of the RPM counter 462 representing the result of the count of the pulses PC is transferred to the RPM register 430 of the output register group 474. The RPM counter 462 is reset when the content of the RPMWBF 552 is "1".

The processing at the stage VSPSTG is similar to that described above.

The above described embodiment of this invention has a reference register group, an instantaneous register group and a comparison result holding register group, wherein a register is selected from each of the register groups and connected with the comparator in accordance with the outputs of the stage counter. Thus, numerous control functions can be realized with a relatively simplified circuit configuration.

In particular, by virtue of such arrangement that the input/output circuit 114 are composed of the registers which allow reading and writing operations so that the CPU 108 can fetch the data stored in these registers, it is possible to confirm or verify the previously set data. Thus, the new data can be compared with the old data, the result of the comparison being made use of in the subsequent controls such as the ignition timing control, the fuel injection quantity control and the like, to a great advantage.

FIG. 6 shows an exemplary arrangement of the interrupt signal generation circuit 200. Referring to this figure, a status register 202 and a mask register 204 are each of eight-bit capacity. The bit outputs $2^0$ and $2^1$ of the status register 202 and the corresponding bit outputs of the mask register 204 are supplied to the inputs of AND gates 206 to 208, respectively. The outputs of these AND gates 206 to 208 are coupled together to the inputs of an OR gate 216. The output signal of logic "1" produced from the OR gate 216 is utilized as the interrupt request signal IRQ which is furnished to the CPU 108.

Elucidating more specifically the individual bits of the status register 202, the bit $2^0$ is set by the constant angle signal ANGL supplied from the register 512 and is effective to generate an angle signal interrupt request ANGL IRQ. The bit $2^1$ is set by the time data INTVD supplied from the register 516 and is effective for producing an interval interrupt request INTV IRQ. The bit $2^2$ is set by the signal RPMWD produced from the register 552 and represents that the duration or interval for measuring the engine rotation number has elasped and is effective for producing an engine rotation number measurement termination interrupt request (hereinafter referred to simply as RPMEND IRQ). The bit $2^3$ is set by the output of the AND gate 218 having inputs supplied with the RPMSTG signal produced from the SCD 572 and the carry signal produced by the incrementor 478 exhibiting the counter function described hereinbefore, and is effective for producing an overflow interrupt request (hereinafter referred to simply as RPMOVF IRQ). The bit $2^4$ is set by the signal produced by the ADC 102 upon completion of the A/D conversion and is effective for producing an A/D conversion termination interrupt request (hereinafter to simply as ADEND IRQ).

With the arrangement described above, it is assumed that a given one of the bits of the status register 202 is set and that the bit of the mask register 204 corresponding to the set bit of the register 202 is set by an interrupt inhibition clearing signal supplied from the CPU 102. Then, the logical product of these two bit signals produced by the AND gate 216 is logic "1", resulting in the output of logic "1" from the OR gate 216. The interrupt request signal IRQ thus produced is supplied to the CPU 108.

As seen in FIG. 7, the crank angle sensor 106 generates pulses in synchronism with the engine rotation so that the rotation speed of the engine can be detected by counting the pulses generated by the crank angle sensor 106 for each unit time. The unit times are measured by the timer 1032, which is actually composed of the RPMW register 426, the RPMWT register 460, the comparator 480, and the registers 550 and 552 in FIG. 2, as already described. This timer operates in the manner shown and described in conjunction with FIG. 5, and the set signals which are outputted in FIG. 4 to the register 432 occurs at each lapse of the unit time.

The pulses generated by the crank angle sensor 106 are counted by the counter 1034 which is composed of the RPMC register 462 and the incrementor 478, and the operation of this counter is as shown and described in conjunction with FIG. 17C. The overflow from the counter 1034 is detected by the incrementor 478 and the detection signal is outputted to the interruption generator circuit 200. When the set output of the timer 1032 is outputted to the register 432 for holding the counted value of the hard counter 1034, the counted value of the register 462 for holding the counted value is set and held in the register 432 through the latch 476. After the count value has been transferred to the register 432, the hard counter 1034 is reset by the timer 1032.

The interruption generating circuit 200 requests the interruption process from the CPU each time an overflow signal is produced by the counter 1034. Namely, the output of the incrementor 478 is set into the register 202 through the AND gate 218, and the interruption request signal IRQ is generated from the MASK register 204. In response to the interrupt request signal, the CPU counts the number of overflow signals generated during the speed measuring operation.

In accordance with the present invention, at the end of the elapsed time measured by the timer 1032, the count value in the hard counter 1034 is corrected in accordance with the number of overflow signals detected during the unit time. More particularly, for each overflow signal detected during the unit time, the maximum count of the hard counter 1034 is incremented by one and added to the value stored in the register 432. In this way, the present invention is capable of measuring the speed of rotation of the engine over a wise range of speeds using a counter of small capacity, thereby not only simplifying the circuit arrangement of the speed measuring apparatus, but also increasing the responsiveness of that apparatus.

Next, by referring to flow charts shown in FIGS. 8 and 9, description will be made in conjunction with the processing which concerns the measurement of the rotational speed or rotation number of the engine. Referring to FIG. 8, which shows a processing program for the RPMOVF IRQ, the program is activated at a step 910 by the RPMOVF IRQ signal. At the step 912, the count of the soft counter SC provided in the RAM 112 is incremented by unity (one). At the step 914, the execution of this program is completed, and the content held by the CPU 108 before the interrupt and stored in RAM 112 at a stand-by area thereof during the processing of the interrupt is returned to the CPU 108 to allow the preceding processing being interrupted to be restored.

Referring to FIG. 9 which shows a program for processing the RPMEND IRQ, this program is activated in response to the RPMEND IRQ signal at a step 916. At the next step 918, the count of the hard counter is fetched by the CPU. More specifically, the value corresponding to the number of the angle pulses PC counted by the RPM counter 462 during the measuring period RPMW determined by the RPMW timer 460 is supplied to the CPU 108.

At a step 920, it is decided whether the count of the soft counter SC described above is zero or not, i.e. whether the number of occurrences of overflow in the RPM counter 462 is zero or not. When it is decided at the step 920 that the count of the soft counter SC is zero, a jump is made to a step 926 where the content of the RPM counter 462 sampled at the step 918 is transferred to the RAM 112 to be stored therein as the data of the engine rotation number.

On the other hand, when a decision is made such that the count of the soft counter SC is not zero at the step 920, then the step 922 is next executed, whereby the count sampled at the step 912 is added with the value ($N_{max}+1$) where $N_{max}$ represents the maximum count of the RPM counter 462. This is because the count of the RPM counter 462 really corresponds to the value ($N_{max}+1$) when an overflow occurs in the same counter 462.

At a step 924 following the step 922 where the data of engine rotation number has been corrected for the single overflow, the count of the soft counter SC is decreased by unity (one). Subsequently, the proccessing of the step 920 is resumed. In this manner, the processings at the steps 920, 922 and 924 are repeatedly carried out until the count of the soft counter SC is zero, to thereby effect the corection for the overflow. When it is found at the step 920 that the content of the soft counter is zero, the step 296 is next executed where the count of the RPM counter 462 sampled at the step 918 and having been corrected for the overflow is transferred to the RAM 112 to be stored therein as the data relating to the engine rotation number. At the next step 928, the processing of the RPMEND IRQ is terminated and the preceding processing as interrupted is resumed.

As will be understood from the above description, by virtue of the arrangement that the count of the hard counter for measuring the revolution number of the engine is corrected in consideration of the number of occurrences of overflow upon expiration of the measuring period with the aid of the soft counter, it is possible to measure the number of revolutions of the engine with a high accuracy over the whole speed range from a low speed region to a high speed region by using counters of a reduced bit capacity. Further, because the comparator circuits, incrementor, registers and other elements which are used in common may be of the same bit capacity, the required hardware structure can be inplemented in simplified configurations.

It will now be appreciated that the invention has provided a system for measuring the rotation number of engine with a high accuracy over an extensive speed range with a counter of a reduced bit capacity.

What is claimed is:

1. In an engine control apparatus having a crank angle sensor for producing an output signal at every predetermined rotational angle of an engine shaft, an arithmetic processing unit for executing arithmetic operations in accordance with a program, and an input/output circuit, wherein said input/output circuit includes timer means for producing a timing signal every time a preset period for measuring the rotational speed of the engine elapses, a crank angle counter for counting output pulses derived from said crank angle sensor, an overflow detecting means for detecting each occurrence of an overflow in said counter and for generating an overflow signal in response thereto;

a method of measuring the rotational speed of said engine in which said arithmetic processing unit executes the steps of:

(a) counting the number of overflow signals produced at the output from said overflow detecting means while said crank angle counter counts the output pulses from said crank angle sensor;

(b) reading the count value of said crank angle counter in response to the timing signal output from said timer means;

(c) correcting the read counter value of said crank angle counter by an amount based on the count value of said number of overflow signals and the maximum count capacity of said crank angle counter;

(d) determining the rotational speed of the engine on the basis of the corrected read counter value;

(e) controlling the operation of the engine on the basis of the predetermined rotational speed;

(f) resetting to zero the count of said number of overflow signals and the count value of said crank angle counter; and (g) repeating the steps (a) to (f).

2. A method of measuring the rotational speed of an engine according to claim 1, wherein said input/output circuit further includes a status register for receiving the output from said overflow detecting means and the output from said timer means, and an interrupt circuit for producing a request for an interrupt service to said arithmetic processing unit in response to loading of a signal in said status register, said step (a) being executed in response to an interrupt service request issued upon loading of the output from said overflow detecting means in said status register, and said step (b) being executed in response to an interrupt service request issued upon loading of the output from said timer means in said status register.

3. A method of measuring the rotational speed of an engine according to claim 1, wherein said steps (c) and (d) comprise (1) adding to the read count value of said crank angle counter a value equal to the maximum count value of said crank angle counter increased by one;

(2) decrementing by one count of the number of overflow signals;

(3) repeating the steps (1) and (2) until the count of the number of overflow signals is decremented to zero.

4. A method for measuring the rotational speed of an engine according to claim 1, wherein said engine control apparatus includes a soft counter, and wherein said step (a) comprises incrementing a value stored in said soft counter in accordance with the output of said overflow detecting means.

5. In an engine control apparatus having a crank angle sensor for producing an output signal at every predetermined rotational angle of an engine shaft, an arithmetic processing unit for executing arithmetic operations in accordance with a stored program, memory means connected to said arithmetic processing unit for storing programs and data, and an input/output circuit connected to said arithmetic processing unit and said memory means, means for measuring the rotational speed of the engine, comprising: timer means for producing a timing signal every time a preset period for measuring the rotational speed of the engine elapses; a crank angle counter connected to said crank angle sensor and having a predetermined maximum count capacity which is less than the count value required for a maximum engine rotational speed to be measured for counting the output pulses derived from said crank angle sensor; and overflow detecting means connected to said crank angle counter for detecting each occurrence of an overflow in said crank angle counter and for generating an overflow signal in response thereto; said arithmetic processing unit operating on the basis of said stored programs to count the number of overflow signals generated while said crank angle counter counts the output pulses from said crank angle sensor, to read the count value of said crank angle counter in response to the timing signal output from said timer means, to correct the count value read from said crank angle sensor on the basis of the maximum count capacity of said crank angle counter and the number of overflow signals counted by said overflow counting means at the time of generation of said timing signal, and to calculate the rotational speed of said engine on the basis of said corrected count value.

6. An apparatus for measuring the rotational speed of an engine according to claim 5, wherein said timer means includes a hold register for holding a data value representing the period for measuring the rotational speed of the engine, a second counter for incrementing the content thereof every time a predetermined time interval has elapsed, and a comparator for comparing the content of said hold register with the content of said second counter and for generating said timing signal when a comparison is detected.

7. An apparatus for measuring the rotational speed of an engine according to claim 6, wherein said crank angle counter for counting the pulses derived from the output of said crank angle sensor and said second counter in said timer means are provided with a first count register for holding the count value of said crank angle sensor and a second counter register for holding a count value representative of an elapsed time, and further including an adder circuit for advancing the count values held in said first and second count registers, a circuit for producing first and second select signals, means for selecting said first count register in response to said first select signal; means for activating said adder circuit in accordance with the output from said crank angle sensor to thereby load the output of said adder circuit in said first count register; means for loading a signal representative of said overflow in said status register in response to a carry signal produced by said adder circuit; and means for supplying the output from said second count register in said adder circuit in response to said second select signal to thereby increment the content of said adder circuit, including means for returning said incremented content to said second counter register.

* * * * *